US006004643A

United States Patent [19]

Scheggetman

[11] Patent Number: 6,004,643

[45] Date of Patent: Dec. 21, 1999

[54] SELF-ADHESIVE LABEL AND METHOD OF MANUFACTURE THEREOF

[75] Inventor: Wim Scheggetman, Flynn Act, Australia

[73] Assignee: Valdanason Consultants Pty Ltd., Flynn Act, Australia

[21] Appl. No.: 09/002,245

[22] Filed: Dec. 31, 1997

[30] Foreign Application Priority Data

| | | | |
|---|---|---|---|
| Jun. 16, 1997 | [AU] | Australia | 7389 |
| Sep. 24, 1997 | [AU] | Australia | 9418 |

[51] Int. Cl.[6] .......... B32B 7/12

[52] U.S. Cl. .......... 428/42.2; 428/40.1; 428/43; 283/81

[58] Field of Search .......... 428/40.1, 43, 42.2; 283/81

[56] References Cited

U.S. PATENT DOCUMENTS

| | | | |
|---|---|---|---|
| 3,892,901 | 7/1975 | Smith | 428/42.2 |
| 4,302,513 | 11/1981 | Russell | 428/40.1 |
| 4,661,189 | 4/1987 | Voy et al. | 428/40.1 |

FOREIGN PATENT DOCUMENTS 590093 10/1989 Australia .

*Primary Examiner*—Alexander Thomas
*Attorney, Agent, or Firm*—Watson Cole Grindle Watson, P.L.L.C.

[57] ABSTRACT

A self-adhesive label is formed by incompletely coating a release layer with adhesive which has a greater affinity to the label than to the release layer. The adhesive is transferred to the label and the incomplete coating of the release layer allows the release layer to define a salvage to facilitate removal of the release layer from the label.

8 Claims, 1 Drawing Sheet

SELF-ADHESIVE LABEL AND METHOD OF MANUFACTURE THEREOF

TECHNICAL FIELD

This invention relates to a self-adhesive label and to a method of manufacture thereof.

This invention has particular but not exclusive application to self-adhesive labels adapted to be adhered to shelves in supermarkets or the like for indicating the price or other information of articles on the shelves. Such products are known in the trade as "Shelf Talkers".

BACKGROUND ART

Shelf Talkers are known in various forms. In all cases the Shelf Talker includes a printable label for presenting the relevant information to a shopper together with some form of adhesive means for adhering the printable label to a shelf or other support.

DISCLOSURE OF INVENTION

This invention in one aspect relates to a self-adhesive label comprising a printable label, adhesive on a portion of the rear face of the printable label, and a release layer covering the adhesive, wherein the release layer overlaps the adhesive so as to define a salvage.

Preferably, the adhesive is transferred to the rear face of the printable label from the release layer during manufacture and, prior to transfer, the adhesive incompletely covers the release layer such that the release layer defines a salvage after manufacture.

As used herein, the term "salvage" is used to indicate a manually graspable portion of the release layer whereby the release layer can be removed to reveal the adhesive which remains on the rear face of the printable label for the purpose of adhering the printable label to a support.

In another aspect the invention resides in a method of manufacturing a self-adhesive label, the method including:

incompletely coating a release layer with adhesive; and fixing the incompletely coated release layer to the rear face of a printable label whereby the adhesive is transferred to the rear face of the printable sheet and whereby a salvage is defined by the release layer.

BRIEF DESCRIPTION OF DRAWINGS

In order that this invention may be more easily understood and put into practical effect, reference will now be made to the accompanying drawings which illustrate a preferred embodiment of the invention, wherein.

BEST MODE

Figure 1:
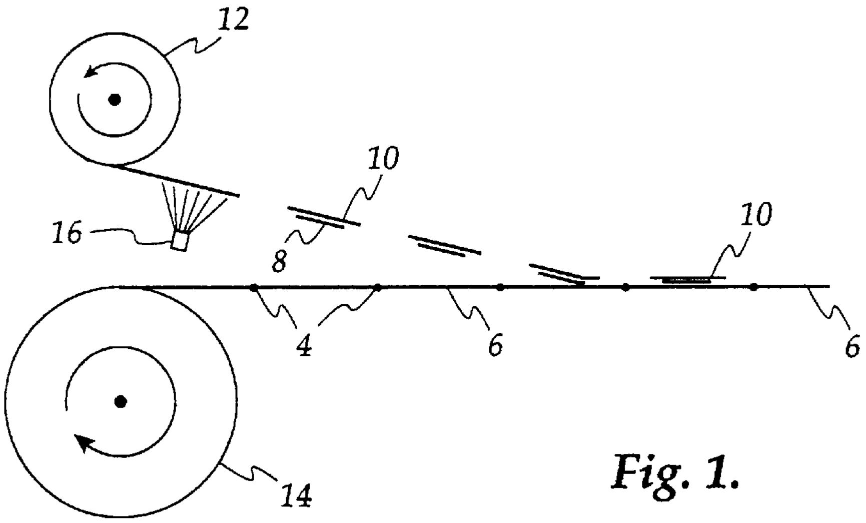
FIG. 1 is a schematic view showing the continuous manufacture of a row of self-adhesive labels according to the invention.

Referring to FIG. 1, the manufacture of a continuous row of self-adhesive labels is schematically illustrated.

Release layer 10 is fed from a continuous roll 12. Release layer 10 passes adhesive nozzle 16 which periodically sprays adhesive 8 onto the release layer. Because the spray is intermittent, portions of release layer 10 are uncoated with adhesive. Of course, another way of achieving incomplete coverage of the release layer is to control the direction of the spray as opposed to controlling the timing of the spray.

The continuous release layer is then cut into lengths. Each length of release layer is then applied or fixed to the rear face of printable label 6. It will be noted that printable label 6 is continuously supplied from roll 14. Each individual label 6 is seperated from an adjacent printable label 6 by lines of perforations 4.

Because the adhesive has a greater affinity for the printable label 6 than the release layer 10, it is "transferred" to the rear face of the printable label 6. Accordingly, the adhesive remains on the printable label when the release layer 10 is pealed away. The printable label can then be adhered to a support.

Figure 2:
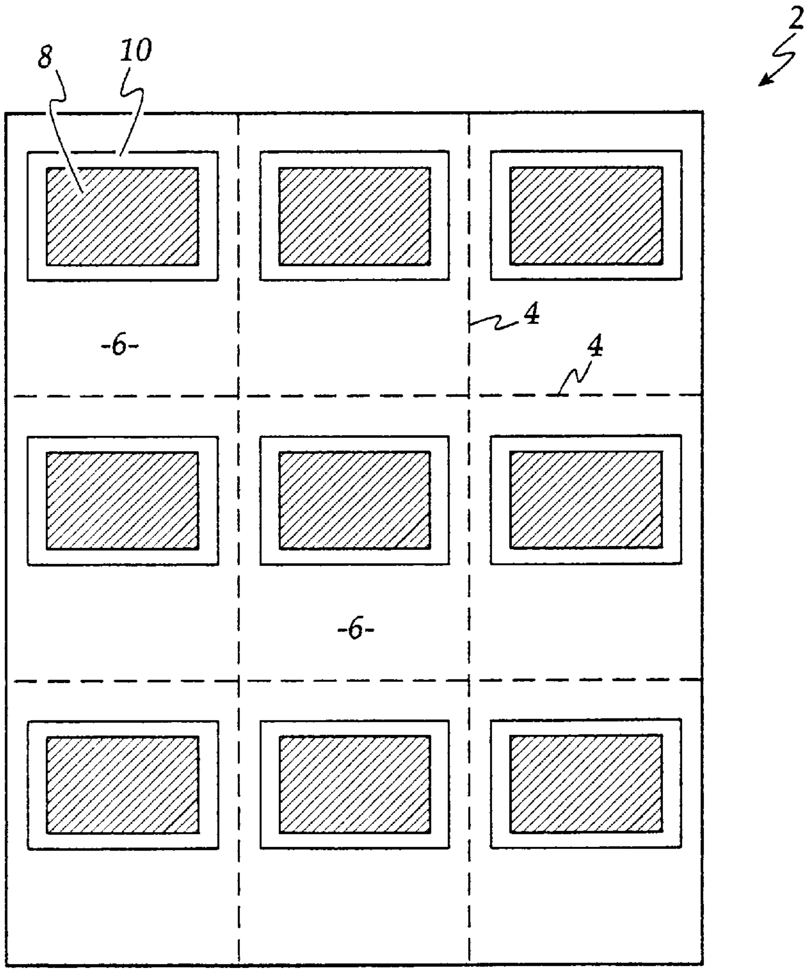
FIG. 2 is a rear view of a sheet of three rows of self-adhesive labels showing the release layers associated with each printable label of the sheet.

As shown in FIG. 2, sheet 2 includes lines of perforations 4 extending widthwise and lengthwise. As shown, sheet 2 is thereby divided into nine self-adhesive labels.

Each printable label 6 has adhesive 8 (hatched area) on its rear side. The adhesive is covered by release layer 10 which is rectangular in shape. Thus, a plurality of independent or unconnected release layers 10 are disposed on the rear side of the sheet.

As can be seen, the release layer extends beyond the adhesive to define a "salvage" which facilitates removal of the release layer. As shown, the salvage extends around all four sides of the release layer, i.e. the release layer overlaps the edge of the adhesive on all four sides. Of course, the salvage need not extend about all four sides but need only be sufficient for the purpose of providing means for removing the release layer from the printable label.

The fact that the release layer associated with each self-adhesive label is discrete and independent of the release layers of adjacent self-adhesive labels enables adjacent self-adhesive labels to be easily seperated by breaking the line of perforations disposed between the self-adhesive labels.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

I claim:

1. An integral array of self-adhesive labels, adjacent self-adhesive labels being separable from each other via perforations disposed intermediate adjacent self-adhesive labels, each self-adhesive label being printable on the front side thereof and including on the rear side thereof an area of adhesive which incompletely covers the rear side of the self-adhesive label, each area of adhesive being covered by a release layer which defines a salvage to facilitate removal of each release layer from its respective area of adhesive.

2. A plurality of self-adhesive labels as defined in claim 1, wherein each release layer is non-integral with adjacent release layers associated with adjacent self-adhesive labels.

3. A plurality of self-adhesive labels as defined in claim 1, wherein the adhesive is a transfer adhesive that is transferred from the release layer to the label during manufacture.

4. A self-adhesive label comprising, a printable label having an outer periphery, said label having a front face adapted to receive printing thereon, and an opposite rear face, a release layer having an outer periphery and opposite faces, a portion of said outer periphery of said label being spaced outwardly of a portion of said outer periphery of said release layer, and adhesive material having an outer periphery, said adhesive material being disposed between said label and said release layer and being in contact with said rear face of the label and one of said faces of said release layer, a portion of the outer periphery of said release layer being spaced outwardly of a portion of the outer periphery of said adhesive material.

5. A self-adhesive label as defined in claim 4, wherein the entire outer periphery of the label is spaced outwardly of the entire outer periphery of the release layer.

6. A sheet of self-adhesive labels comprising, a sheet of printable material having lines of perforations dividing the sheet into a plurality of individual printable labels which can be readily detached from one another, each individual label including an outer periphery, a front face adapted to receive printing thereon and an opposite rear face, each individual label having an adhesive layer in contact with the opposite rear face of the individual label, said adhesive layer having an outer periphery, each individual label having a release layer in contact with said adhesive layer and having an outer periphery, a portion of the outer periphery of the release layer of each individual label being spaced outwardly of a portion of the outer periphery of the adhesive material in contact therewith, a portion of the outer periphery of each individual label being spaced outwardly of a portion of the outer periphery of the release layer associated therewith.

7. A self-adhesive label as defined in claim 6, wherein the entire outer periphery of each individual label is spaced outwardly of the entire outer periphery of the adhesive material in contact therewith.

8. A self-adhesive label as defined in claim 6, wherein the entire outer periphery of each individual release layer is spaced outwardly of the entire outer periphery of the adhesive material in contact therewith.

* * * * *